(12) United States Patent
Jiang et al.

(10) Patent No.: US 8,962,181 B2
(45) Date of Patent: Feb. 24, 2015

(54) BATTERY SPACE, BATTERY PROTECTING DEVICE AND POWER BATTERY COMPRISING THE SAME

(75) Inventors: Luxia Jiang, Guangdong (CN); Jianhua Zhu, Guangdong (CN)

(73) Assignees: Shenzhen BYD Auto R&D Company Limited, Shenzhen (CN); BYD Company Limited, Shenzhen (CN)

(*) Notice: Subject to any disclaimer, the term of this patent is extended or adjusted under 35 U.S.C. 154(b) by 183 days.

(21) Appl. No.: 13/701,424

(22) PCT Filed: Apr. 27, 2011

(86) PCT No.: PCT/CN2011/073397
§ 371 (c)(1),
(2), (4) Date: Jan. 31, 2013

(87) PCT Pub. No.: WO2011/150727
PCT Pub. Date: Dec. 8, 2011

(65) Prior Publication Data
US 2013/0122346 A1    May 16, 2013

(30) Foreign Application Priority Data

May 31, 2010  (CN) .................. 2010 2 0213308 U
Nov. 30, 2010  (CN) .................. 2010 2 0678517 U

(51) Int. Cl.
*H01M 2/02* (2006.01)
*H01M 2/04* (2006.01)
*H01M 2/10* (2006.01)
(Continued)

(52) U.S. Cl.
CPC .............. *H01M 2/18* (2013.01); *H01M 2/1016* (2013.01); *H01M 2/1061* (2013.01); *H01M 2/1077* (2013.01); *H01M 2/1083* (2013.01); *H01M 2/206* (2013.01)

USPC ........... 429/186; 429/159; 429/163; 429/177; 429/211; 429/143

(58) Field of Classification Search
USPC ................. 429/129–147, 247–255, 149–160, 429/163–187
See application file for complete search history.

(56) References Cited

FOREIGN PATENT DOCUMENTS

CN    201022084 Y    2/2008
CN    201022084 Y    2/2008
(Continued)

OTHER PUBLICATIONS

Machine Translation of Jiang et al. (CN 201430167, published Mar. 2010, pp. 1-5).*
(Continued)

*Primary Examiner* — Basia Ridley
*Assistant Examiner* — Caitlin Wilmot
(74) *Attorney, Agent, or Firm* — Morgan, Lewis & Bockius LLP

(57) ABSTRACT

A battery spacer is provided. The battery spacer (2) comprises a first spacing plate (22) and a second spacing plate (22') aligned with and spaced from each other in a longitudinal direction and a plurality of beams (211) parallel to and spaced from each other in a transverse direction. Each beam (211) is connected between the first and second spacing plates (22, 22) in the longitudinal direction and protrudes outwardly from a plane formed by back surfaces of the first and second spacing plates (22, 22). The beams (211) are configured to securely receive at least tabs of cell cores between neighboring beams (211). A battery protecting device and a power battery are provided as well.

18 Claims, 4 Drawing Sheets

(51) Int. Cl.
*H01M 2/22* (2006.01)
*H01M 2/18* (2006.01)
*H01M 2/20* (2006.01)

(56) References Cited

FOREIGN PATENT DOCUMENTS

| CN | 201345371 Y | 11/2009 |
|---|---|---|
| CN | 201345372 Y | 11/2009 |
| CN | 201345382 Y | 11/2009 |
| CN | 201430167 Y | 3/2010 |
| CN | 201430167 Y | 3/2010 |
| WO | WO2006/105402 A2 | 10/2006 |
| WO | WO 2006105402 A2 | 10/2006 |

OTHER PUBLICATIONS

BYD Company Limited, International Search Report, PCT/CN2011/073397, Aug. 4, 2011, 5 pgs.

BYD Company Limited, ISR WO-PCTCN2011073397, Aug. 4, 2011, 9 pgs.

\* cited by examiner

BATTERY SPACE, BATTERY PROTECTING DEVICE AND POWER BATTERY COMPRISING THE SAME

CROSS REFERENCE TO RELATED APPLICATIONS

This application is a United States National Stage Application filed under 35 U.S.C. §371 of PCT Patent Application Serial No. PCT/CN2011/073397 filed on Apr. 27, 2011, which claims the benefit of and priority to Chinese Patent Application No. 201020678517.3 filed on Nov. 30, 2010, and Chinese Patent Application No. 201020213308.1 filed on May 31, 2010, which are hereby incorporated by reference herein in their entireties.

FIELD

The present disclosure relates to a power battery, more particularly to a battery spacer, a battery protection device and a power battery comprising the same respectively.

BACKGROUND

Presently, a power battery normally comprises a positive electrode, a negative electrode, an electric core formed by overlapping a plurality of layers of flexible electrode plates, an electrolyte, a battery cover plate and a battery housing for accommodating the same. And further, a spacer may be disposed in a space between the positive/negative electrode and the battery cover plate.

Normally, the power battery with a high capacity has a large volume. Meanwhile as the electric core is formed from a plurality of layers of flexible electrode plates, it may be broken or damaged during storage or transportation. Further, when there is more than one electric core in the power battery, the positioning of the electric cores inside the battery housing may render further difficulty due to the loosening of the electric cores contained therein.

SUMMARY

The present disclosure is directed to provide a novel battery spacer that may be resistant to vibration or short circuit, which is also very easy for assembly and may not be easily damaged. Also a battery protecting device may need to be provided. Further, a power battery may also need to be provided, with enhanced protection of the electric cores contained therein as well as decreased weight.

According to an embodiment of the present disclosure, a battery spacer may be provided. The battery spacer may comprise: a first spacing plate and a second spacing plate aligned with and spaced from each other in a longitudinal direction; and a plurality of beams parallel to and spaced from each other in a transverse direction, each beam being connected between the first and second spacing plates in the longitudinal direction and protruding outwardly from a plane formed by back surfaces of the first and second spacing plates. The beams may be configured to receive at least tabs of electric cores between neighboring beams.

The battery spacer of the present disclosure not only may meet the insulation requirement, but also may realize good protection of the upper portion, especially tabs, of the electric core. In addition, the power battery comprising the same may have a reduced weight accordingly.

According to another embodiment of the present disclosure, a battery protecting device may be provided. The battery protecting device may comprise a pair of side plates spaced from each other; and a pair of battery spacers as described hereinabove. One of the pair of the battery spacer connects one ends of the two side plates and the other spacer connects the other ends of the pair side plates.

According to still another embodiment of the present disclosure, a power battery may be provided. The power battery may comprise: at least an electric core; and a protection device as described hereinabove. The at least an electric core is provided between the pair of battery spacers with the tabs of each electric core being received between the neighboring beams of the battery spacers respectively.

The battery protecting device of the present disclosure may have the following advantages. When the electric core(s) is (or are) housed within a cover, the battery protecting device may serve as a protecting frame to rigidly support the electric core(s). In addition, external forces may be limited to further shake or vibrate the electric core(s) in the power battery. Further, the assembly of the power battery adopting the battery protecting device may be simplified, resulting in a compact structure. Still further, the internal space of the power battery may be saved as well.

Additional aspects and advantages of the embodiments of present disclosure will be given in part in the following descriptions, become apparent in part from the following descriptions, or be learned from the practice of the embodiments present disclosure.

DESCRIPTION OF THE DRAWINGS

These and other aspects and advantages of the disclosure will become apparent and more readily appreciated from the following descriptions taken in conjunction with the drawings in which.

DETAILED DESCRIPTION OF THE EMBODIMENTS

Figure 1:
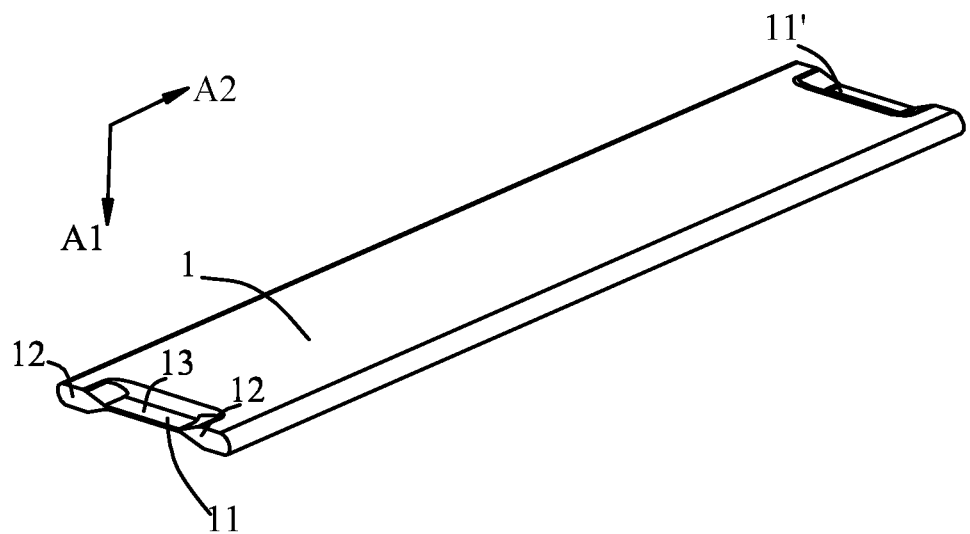
FIG. 1 is a schematic perspective view of an exemplary electric core according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to one embodiment, FIG. 1 is a schematic perspective view of an exemplary electric core 1 according to an embodiment of the present disclosure. In a preferred embodiment, the positive electrode plate and the negative electrode plate of the electric core 1 are aligned with each other in a side along a longitudinal direction A1 thereof whereas staggered in a width direction A2 so as to expose tab areas of the positive and negative electrodes that are not coated with any electrode material. And a separator (not shown) may be disposed between the positive electrode plate and the negative electrode plate. After coiling, the electric core 1 may be obtained accordingly. By winding and pressing in the middle of the positive tab area and the negative tab area without the electrode material being coated thereon at both ends of the electric core 1, a positive tab 11 and a negative tab 11' are formed respectively. As the positive tab 11 is a winded one, to prevent bending or damage to the edge of the tab 11 and to decrease the negative effect of compressing to the curved portion of the electric core 1, preferably, the curved portions at both ends of the electric core 1 are still remained. To be specific, as shown in FIG. 1, the tab 11 may comprise a compressed portion 13 and rounded corner portions 12 formed at both ends of the compressed portion 13.

Figure 2:
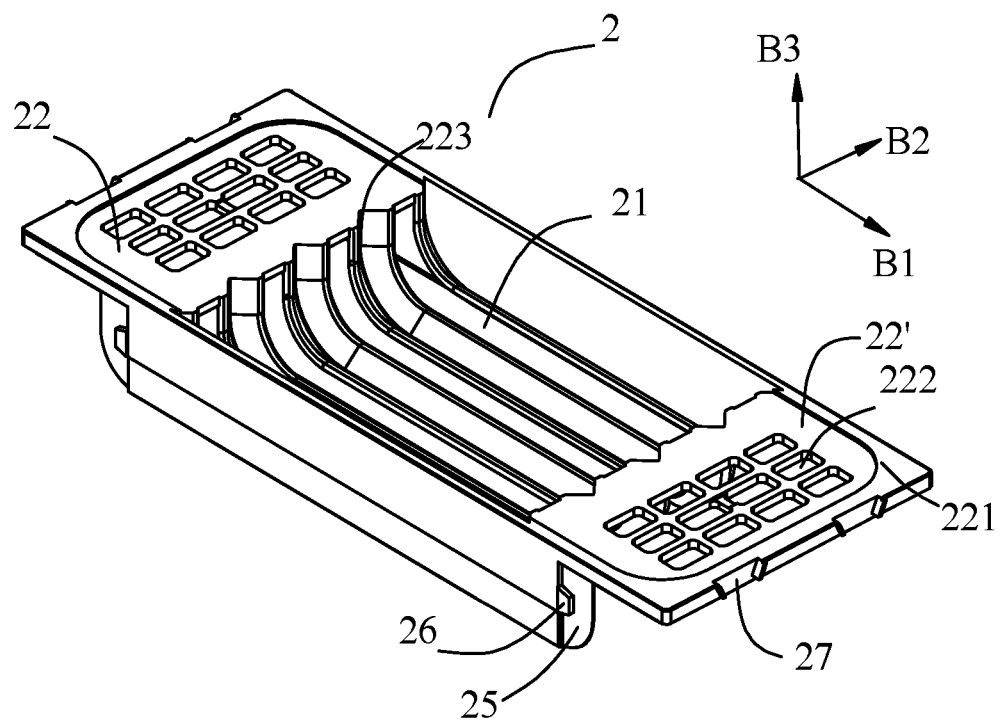
FIG. 2 is a schematic bottom perspective view of a battery spacer according to an embodiment of the present disclosure.
Figure 3:
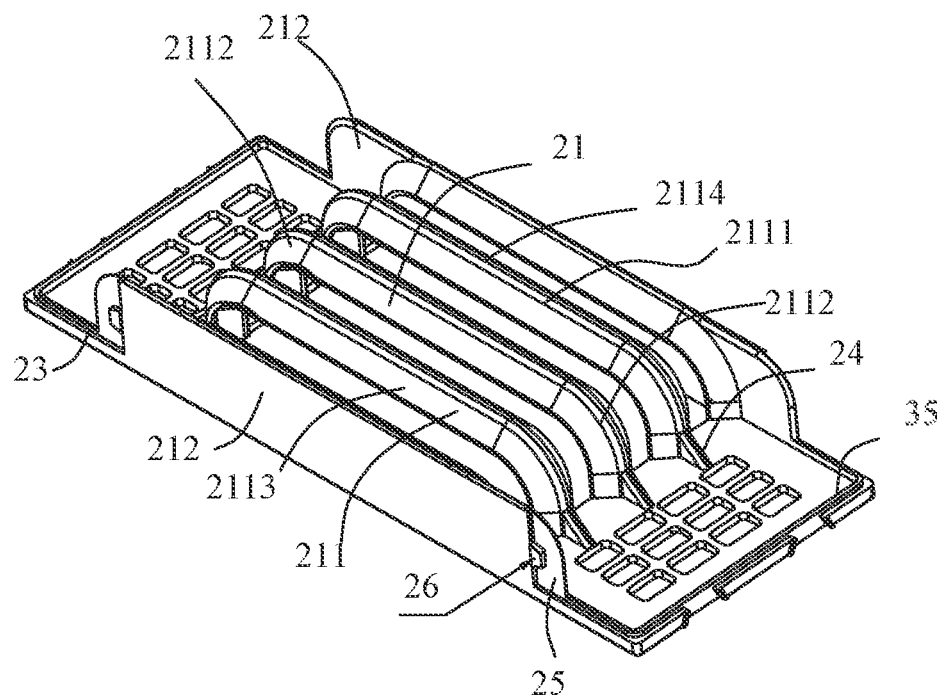
FIG. 3 is a top perspective view of a battery spacer according to an embodiment of the present disclosure.

According to an embodiment of the present disclosure, a battery spacer 2 may be provided. The battery spacer 2 may comprise a spacing plate 22 and a spacing plate 22' aligned with and spaced from each other in a longitudinal direction B1; and a plurality of beams 211 parallel to and spaced from each other in a transverse direction B2. And each beam 211 is connected between the spacing plates 22, 22' in the longitudinal direction B1 and protruding outwardly from a plane formed by back surfaces of the spacing plates 22, 22'. The beams 211 may be configured to receive at least the tabs of electric cores between neighboring beams 211. As shown in FIG. 2 and FIG. 3, the tabs 11 of the electric core 1 may be securely received between the neighboring beams 211, so that the compressed portion 13 may be interposed between the neighboring beams 211 and the rounded corner portions 12 may be received at the spacing plates 22, 22' respectively. According to an embodiment of the present disclosure, enough space may be preserved under the battery spacer 2 so that during assembling, the tab 11 and the battery spacer 2 will not block the assembling process or hurt the rounded corner portions 12. In addition, the assembly process is simplified accordingly.

FIG. 2 and FIG. 3 show a schematic bottom perspective view and a top perspective view of the battery spacer 2 according to some embodiments of the present disclosure. In some embodiments, the battery spacer 2 may be divided into a current extracting area 21 and gas releasing areas 22 located at both ends of the current extracting area 21.

Figure 6:
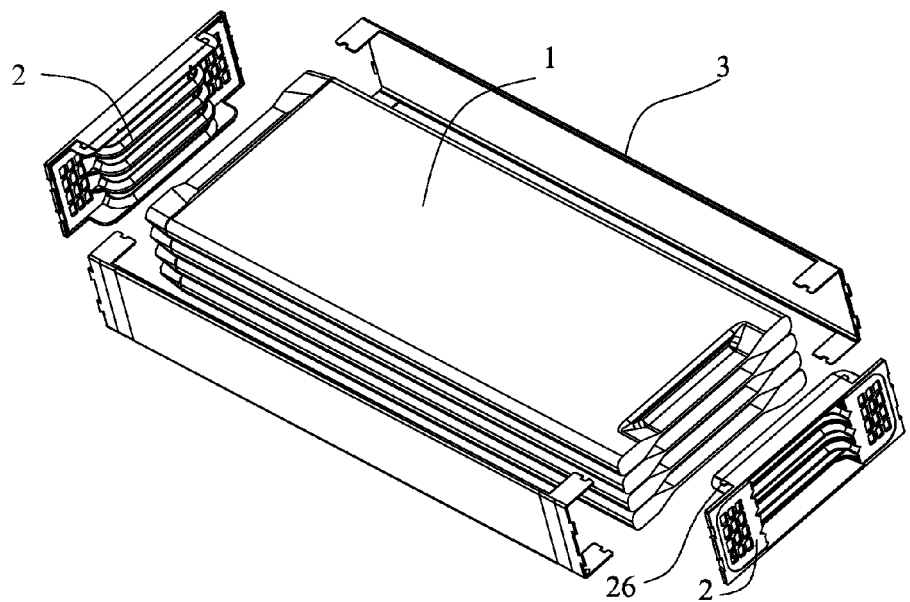
FIG. 6 is an exploded perspective view of a power battery according to an embodiment of the present disclosure.

In some embodiments, the current extracting area 21 comprises two or more parallel beams 211. The adjacent beams 211 form a space for penetrating through the compressed portion 13 and hold thereof accordingly. In this case, as shown in FIG. 6, a plurality of the electric cores 1 may be assembled and two beams 211 at the outermost side may preferably be distributed along the two sides to support the spacer 2.

The battery spacer 2 may preferably include blocking plates 212, 212' connected between the corresponding lateral sides of the spacing plates 22, 22' perpendicular to the transverse direction B2 respectively to protect and support the beams 211 respectively. In case where the blocking plates 212 are provided, in one embodiment, the blocking plates 212 may be separately provided with the outermost beams 211 respectively, and the inner sides of the blocking plates 212 facing the outermost beams 211 are configured to at least receive the tabs 11 of the electric core 1 with the corresponding outermost beams 211 so that the tabs 11 may penetrate through the space formed between the inner sides of the blocking plates 212 and the sides of the outmost beams 211 accordingly. To be specific, at this time, the blocking plate 212 may have a corresponding transition surface opposing the beam 211 to fit the tab 11 of the electric core 1. In another embodiment, the blocking plate 212 may be integrally formed with the outermost beam 211. In this case, the blocking plate 212 is configured to protect the outermost beam 211 and provide support to the entire spacer. Meanwhile, the blocking plate 212 may have a predetermined thickness in the transverse direction B2 and a length smaller than the width of the electric core 1 in the longitudinal direction B1. Thus, spaces may be preserved for the outermost rounded corner portion 12 of the electric core 1, and squeezing to the rounded corner portion 12 during assembly may be prevented.

The spacing plates 22, 22' may be formed with a plurality of via holes 222 to meet fluid exhausting or injection requirements, thus achieving the function of the gas releasing area 22.

In one embodiment, as shown in FIG. 3, the beam 211 may comprise a main portion 2111 and connecting portions 2112 connecting the main portion 2111 and the spacing plates 22, 22' respectively. As shown in FIG. 3, the current extracting area 21 may be divided into areas by the main portions 2111, with the compressed portions 12 of the tabs 11 of the electric cores 1 being interposed securely in the space formed by neighboring main portions 2111 respectively. The connecting portions 2112 may be separately formed.

In some embodiment, each beam 211 may be configured to have a length corresponding to a width of the tab 11 of the electric core 1 in the longitudinal direction B1. In some embodiment, the length of each beam 211 may be about 10%-90% of the width of the tab 11 of the electrical core 1 in the longitudinal direction B1. In another preferred embodiment, the length of the beam 211 is about 30%-80% of the width of the tab 11 of the electric core 1 in the longitudinal direction B1. As for the commonly used electric core 1 of 5-300 Ah, the tab 11 thereof may have a width of about 30-350 mm, the compressed portion 12 of the electric core 1 may have a width of about 20-280 mm. Normally, the current extracting area 21 has a length of about 25%-75% of the width of the electric core 1. In this case, the rounded corner portions 12 of the tab 11 and the separator may be protected from bending or damaging by the battery spacer 2. More preferably, the length of the beam 211 is about 30%-70% of the width of the electric core 1 so as to prevent blocking of the assembly of the rounded corner portion 12 but maintain the strength of the battery spacer 2 accordingly.

In yet another embodiment, the beam 211 has a decreasing width in a thickness direction B3 facing away from the plane formed by the back surfaces of the spacing plates 22, that is, the contacting surface 2113 of the beam 211 matches with one side of the tab 11 of the electric core 1. The beam 211 has a rounded surface 2114 facing the electric core 1, which may avoid damage to the compressed portion 13 of the electric core 1. The main portion 2111 of the beam 211 forms a space matching the gradually thinning width of the upper portion of the electric core 1 to avoid partial sharp corners of the beam 211 hurting the electric core 1. And in this case, many advantages may be obtained, such as excellent fitting performance, easy assembly and secure fixing of the electric cores 1 contained therein. Moreover, the electric cores 1 may be protected from vibration, moving or shaking and so on.

In a preferred embodiment, the main portion 2111 of the beam 211 may have uniform thickness in the longitudinal direction B1. Preferably, each beam 211 may be formed with a V-shaped groove 223 on a side facing toward the plane formed by the back surfaces of the spacing plates 211 to save space for electrolyte injection and also to decrease the deformation during injection molding of the battery spacer 2. Meanwhile, as the used material is decreased, the cost as well as the battery weight is decreased accordingly.

In another preferred embodiment, strengthening ribs 24 are formed at joining portions of each beam 211 with spacing plates 22, 22' respectively to enhance the strength of the battery spacer 2. Preferably, a strengthening flange portion 35 may be formed along the periphery of the spacing plates 22, 22', which may greatly enhance the strength and the stability of the battery spacer 2.

Figure 7:
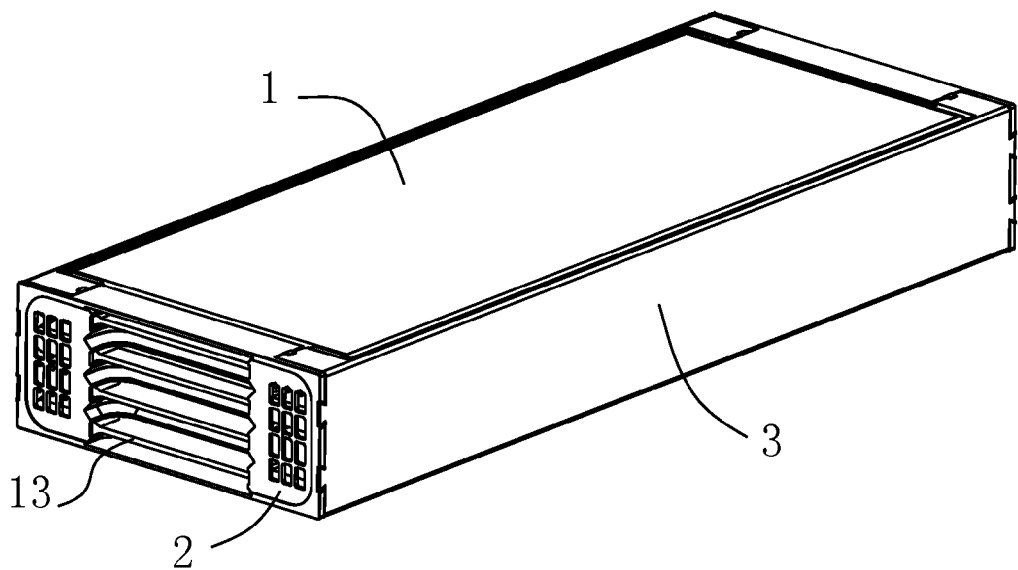
FIG. 7 is a perspective view of a power battery after assembly according to an embodiment of the present disclosure.
Figure 8:
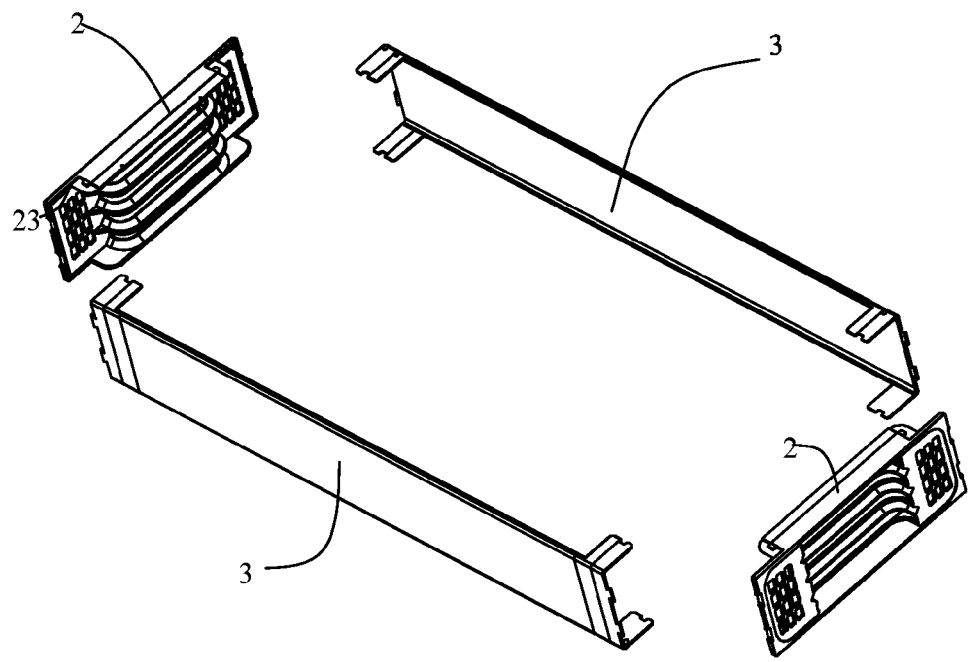
FIG. 8 is a perspective view of a battery protecting device according to an embodiment of the present disclosure.

In the following, a battery protecting device 10 may be provided. The battery protecting device 10, as shown in FIG. 8, may comprise a pair of side plates 3 spaced from each other; and a pair of battery spacers 2 as described hereinabove. One of the pair of the battery spacers 2 connects one ends of the two side plates 3 and the other battery spacer 2 connects the other ends of the pair side plates 3 respectively. The battery spacers 2 and the side plates 3 may be made of an insulation material that is electrolyte resistant and has excellent injection molding performance as well as mechanical strength. In this case, as the battery protecting device 4 is formed into a frame shape, it may provide a supporting skeleton for the electric cores 1 contained therein (referring to FIG. 6 and FIG. 7). During storing, transportation or using process, it may protect the electric core 1 safely. Meanwhile, when a battery housing (not shown) is fitted over the electric cores 1, the wrinkle or shrinkage risk of the separator in the fitting-over direction of the battery housing may be lowered, and relative movement between the electric cores 1 may be limited to a certain extent. Therefore, anti-vibration performance of single cells and the safety performance of a power battery may be improved accordingly.

Figure 4:
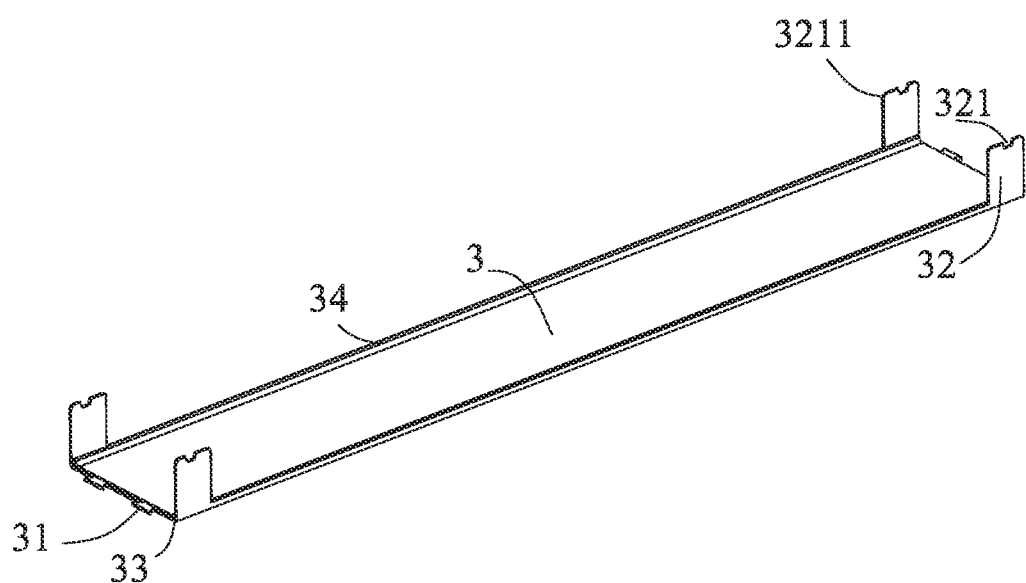
FIG. 4 and FIG. 5 are schematic perspective views of side plates in a battery protecting device according to some embodiments of the present disclosure.
Figure 5:
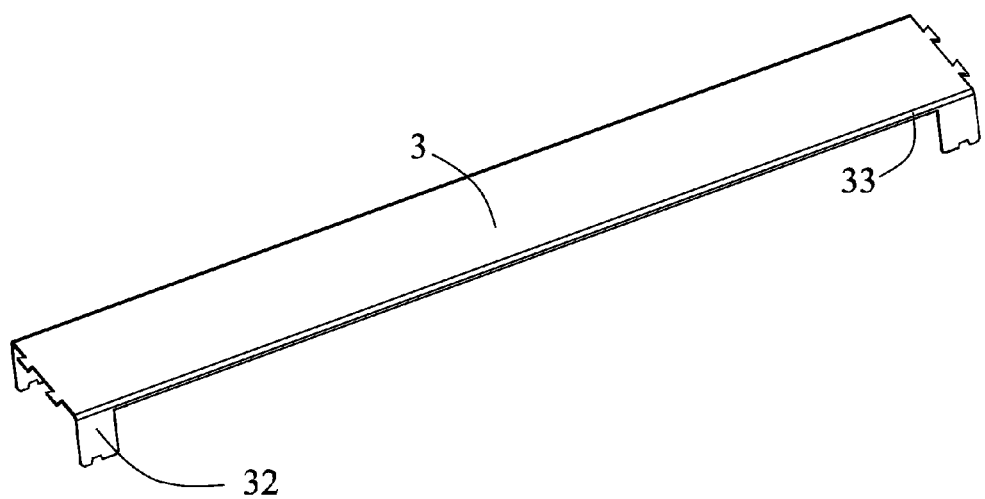

In a preferred embodiment, the battery spacer 2 and the two side plates 3 may be connected via mechanical structure or welding. For example, referring to FIG. 6 and FIG. 7, two dove-shaped recesses 27 are formed on the sides of the battery spacer 2 in the transverse direction B2, and each end of the side plate 3 is formed with the corresponding dove-shaped projections 31 for fitting with the dove-shaped recesses 27 respectively, so that a secure fitting relationship may be obtained between the side plates 3 and the battery spacers 2 respectively. And the dove-shaped projections 31 may be connected with the dove-shaped recesses 27 by welding, such as ultrasonic welding, laser welding and so on. According to a preferred embodiment, a fixing groove 23 for tightly fitting with the side plate 3 may be formed along the edges of the periphery of the spacer 2, so that the side plate 3 may have an end formed with parts inserted into the fixing groove 23, matching the spacer 2 to form stable connection, and also may minimize the risk of the electric core 1 contacting the battery cover accidentally due to fitting errors between the battery spacer 2 and the side plate 3. As shown in FIG. 4 and FIG. 5, in a preferred embodiment, the side plate 3 may be formed into an elongated plate shape.

In a preferred embodiment, each of the side plates 3 is formed with a guiding portion 32 at each corner thereof extending in the longitudinal direction B1 toward the battery spacer 2 or the electric core 1 respectively; and the battery spacers 2 are formed with corresponding recessing portions 25 to receive the guiding portions 32 respectively. And the guiding portion 32 may be fixed to the battery spacer 2 along the fixing groove 23. As shown in FIGS. 3 and 4, the guiding portion 32 may have a rounded end 3211, and the rounded end 3211 may be formed with a recessed or concave portion 321, and the recessing portion 25 may be formed with a boss or convex portion 26 to be fitted with the concave portion 321, so that the guiding portion 32 may not accidentally stab or tear the electric cores 1 contained in the battery protecting device 10 and the side plates 3 may be more tightly fitted with the battery spacers 2 via the concave-convex structure. Moreover, separator edges of the electric core 1 may be protected in the battery protecting device 10, so the risk of wrinkle along the fitting direction of the battery shell (not shown) over the electric cores 1 may be limited. By using guiding portions 32 of the side plates 3, the connection of the battery protecting device 10 may be more stable and reliable, so the strength thereof may be enhanced accordingly.

As shown in FIG. 8, the lower surface of the periphery of the battery spacer 2 may be formed with the fixing groove 23 to be mated with the guiding portion 32 of the side plate 3 so that the side of the guiding portion 32 may be inserted into the fixing groove 23 of the battery spacer 2 and fixed via any known welding method, such as spot welding, ultrasonic welding, laser welding and so on. Thus, the connection therebetween may be stable and the risk of electric core 1 contacting the battery cover due to fitting error of the battery spacers 2 and the side plates 3 may be eliminated.

In another preferred embodiment, a rounded corner is formed where the guiding portion 32 is joined with the side plate 3, which is configured to be mated smoothly with the electric core 1, especially the rounded corner portion 12, so that the electric cores 1 contained therein may not be damaged at the peripheral portion thereof accordingly.

The battery protecting device 4 of the present disclosure may be suitable for a single cell or a plurality of cells. As for the battery comprising a plurality of cells, during assembly, the electrode is housed in the battery shell. In the prior art, the electric cores are prefixed by adhesive tapes, and the electric cores and the tabs may be staggered while fitting the battery shell over the electric cores. Also the outermost insulating material on the electric core may be damaged or destroyed. The battery protecting device 10 of the present disclosure may not need the tape-prefixing process, so that not only the working efficiency may be enhanced, but also the staggering of the electric cores and the tabs or current collectors may be decreased or even eliminated. Moreover, the damage to the outermost insulation material during the fitting of the battery cover over the electric core may be decreased or eliminated accordingly.

According to an embodiment of the present disclosure, a power battery may be provided, as shown in FIG. 6. The power battery may comprise at least an electric core; and a protection device 10 as described hereinabove. The electric cores 10 are provided between the pair of battery spacers 2 with the tabs 11 of each electric core 1 being securely received between the neighboring beams 211 of the battery spacers 2 respectively.

Comparing to the adhesive tape fixing method in the art, the power battery of the present disclosure may have a structure in which there are only limited relative movements between the electric cores, which may decrease the effect of vibration to the electric core and enhance the reliability and safety of the power battery accordingly. In addition, the weight of the power battery may be reduced due to the battery protecting device of the present disclosure.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A battery spacer, comprising:
   a first spacing plate and a second spacing plate aligned with and spaced from each other in a longitudinal direction;
   a plurality of beams parallel to and spaced from each other in a transverse direction, each beam being connected between the first and second spacing plates in the longitudinal direction and protruding outwardly from a plane formed by back surfaces of the first and second spacing plates, wherein the beams are configured to securely receive at least tabs of electric cores between neighboring beams;
   a first side blocking plate connected between first longitudinal sides of the first spacing plate and the second spacing pate along the longitudinal direction, the first side blocking plate and the first longitudinal sides being perpendicular to the transverse direction, wherein the first side blocking plate faces a first outermost beam such that a first space is formed between the first side blocking plate and the first outermost beam, the first space adapted to receive a first tab of the electric cores; and
   a second side blocking plate connected between second longitudinal sides of the first spacing plate and the second spacing pate along the longitudinal direction, the second side blocking plate and the second longitudinal sides being perpendicular to the transverse direction, wherein the second side blocking plate faces a second outermost beam such that a second space is formed between the second side blocking plate and the second outermost beam, the second space adapted to receive a second tab of the electric cores,
   wherein a length of each of the first side blocking plate and the second side blocking plate in the longitudinal direction is greater than a first distance between proximal transverse sides of the first spacing plate and the second spacing plate, and smaller than a second distance between distal transverse sides of the first spacing plate and the second spacing plate, wherein one or more dove-shaped recesses are formed on each of the distal transverse sides of the first spacing plate and the second spacing plate respectively,
   wherein the proximal transverse sides of the first spacing plate and the second spacing plate extend along the traverse direction and are spaced from each other in the longitudinal direction, and wherein the distal transverse sides of the first spacing plate and the second spacing plate extend along the transverse direction and are spaced from each other in the longitudinal direction, and
   wherein a recessing portion is connected to an end of each of the first side blocking plate and the second side blocking plate, and a boss portion is formed on the recessing portion, the boss portion extended from the end of each of the first side blocking plate and the second side blocking plate.

2. The battery spacer according to claim 1, wherein each of the beams has a U-shape configuration.

3. The battery spacer according to claim 1, wherein a plurality of via holes are formed on each of the first and second spacing plates respectively.

4. The battery spacer according to claim 3, wherein each beam is configured to have a length corresponding to that of the tab of the electric core in the longitudinal direction.

5. The battery spacer according to claim 3, wherein the length of each beam is about 30%-70% of that of the electrical core in the longitudinal direction.

6. The battery spacer according to claim 2, wherein each beam has a decreasing width in the thickness direction facing away from the plane formed by the back surfaces of the first and second spacing plates.

7. The battery spacer according to claim 6, wherein each beam is formed with a V-shaped groove on a side facing toward the plane formed by the back surfaces of the first and second spacing plates.

8. The battery spacer according to claim 6, wherein each beam has a rounded surface facing toward the electric core.

9. The battery spacer according to claim 1, wherein strengthening ribs are formed at joining portions of each beam with the first and second spacing plates respectively.

10. The battery spacer according to claim 1, wherein
    each of the first side blocking plate and the second side blocking plate is connected between the corresponding longitudinal sides of the first and second spacing plates, the longitudinal sides being perpendicular to the transverse direction respectively.

11. The battery spacer according to claim 10, wherein the first and second side blocking plates are integrally formed with the outermost beams respectively.

12. The battery spacer according to claim 10, wherein the first and second side blocking plates are separately provided, with inner sides thereof being configured to at least receive the tabs of the electric cores with the corresponding outermost beams respectively.

13. A battery protecting device, comprising:
    a pair of side plates spaced from each other; and
    a pair of battery spacers according to claim 1, wherein one of the pair of the battery spacers connects one ends of the two side plates and the other battery spacer connects the other ends of the pair side plates.

14. The battery protecting device according to claim 13, wherein each end of the pair of the side plates is formed with at least a dove-shaped projection, and the sides of the first and second spacing plates are formed with at least a dove-shaped recess for fitting the dove-shaped projection respectively.

15. The battery protecting device according to claim 13, wherein each of the side plates is formed with a guiding portion at each corner thereof extending in the longitudinal direction toward the battery spacer respectively; and
    the pair of battery spacers are formed with corresponding recessing portions to receive the guiding portions respectively.

16. The battery protecting device according to claim 15, wherein the guiding portion has a rounded corner at a free end thereof, and the guiding portion is connected with the corresponding recessing portion via a concave-convex structure formed thereon respectively.

17. The battery protecting device according to claim 13, wherein a rounded corner is formed where the guiding portion is joined with the side plate, which is configured to be mated smoothly with the electric core.

18. A power battery comprising:
    at least an electric core; and
    a protecting device according to claim 13, wherein the at least an electric core is provided between the pair of battery spacers with the tabs of each electric core being securely received between the neighboring beams of the battery spacers respectively.

* * * * *